United States Patent [19]
Gold

[11] Patent Number: 6,100,603
[45] Date of Patent: Aug. 8, 2000

[54] ANTI-THEFT SYSTEM FOR A MOTOR VEHICLE

[75] Inventor: Peter Gold, Sinzing, Germany

[73] Assignee: Siemens Aktiengesellschaft, Munich, Germany

[21] Appl. No.: 09/198,886

[22] Filed: Nov. 24, 1998

[30] Foreign Application Priority Data

Nov. 24, 1997 [DE] Germany ............................ 197 52 029

[51] Int. Cl.[7] .................................................. B60R 25/10
[52] U.S. Cl. ........................... 307/10.2; 307/91; 180/287; 340/539; 340/825.69; 340/825.72; 341/176
[58] Field of Search ............................... 307/10.2, 91, 89; 180/287; 340/426, 573, 579, 825.69, 825.72; 341/176

[56] References Cited

U.S. PATENT DOCUMENTS

| | | |
|---|---|---|
| 4,897,644 | 1/1990 | Hirano . |
| 5,552,641 | 9/1996 | Fischer et al. . |
| 5,616,966 | 4/1997 | Fischer et al. ............................ 180/287 |
| 5,627,529 | 5/1997 | Duckworth et al. ............... 340/825.69 |
| 5,790,014 | 8/1998 | Campbell et al. ........................ 340/426 |
| 5,905,444 | 5/1999 | Zimmer ............................... 340/825.69 |
| 5,926,107 | 7/1999 | Glehr ...................................... 307/10.2 |

FOREIGN PATENT DOCUMENTS

| | | |
|---|---|---|
| 0138090A2 | 4/1985 | European Pat. Off. . |
| 19542441A1 | 5/1997 | Germany . |
| 2 282 252 | 3/1995 | United Kingdom . |
| 2 293 200 | 3/1996 | United Kingdom . |

OTHER PUBLICATIONS

International Application WO 98/50652 (Seubert et al.), dated Nov. 12, 1998.

Primary Examiner—Albert W. Paladini
Attorney, Agent, or Firm—Herbert L. Lerner; Laurence A. Greenberg; Werner H. Stemer

[57] ABSTRACT

Antennas of an anti-theft system are controlled with a pulse width modulated square-wave signal by a power control unit and a phase control unit. The control is such that a change in power causes no change in phase, and vice versa. This is accomplished by varying the pulse width of the square-wave signal if a change in power occurs and at the same time shifting the pulse rise time such that the phase remains constant.

7 Claims, 8 Drawing Sheets

FIG 7
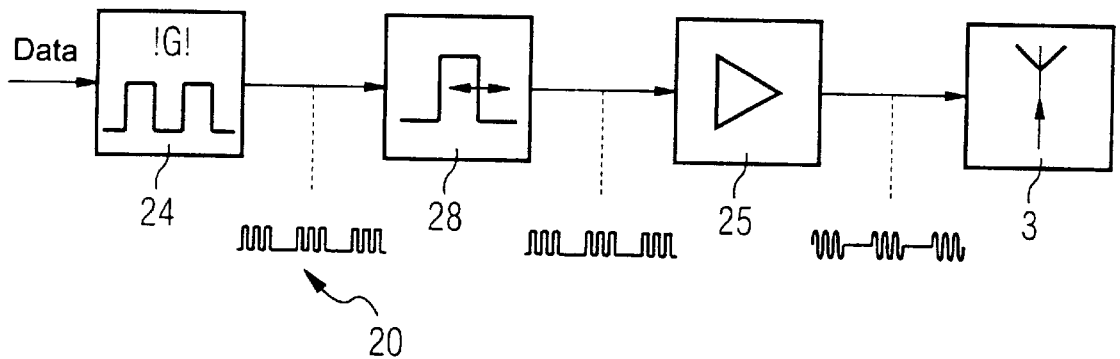
FIG 8
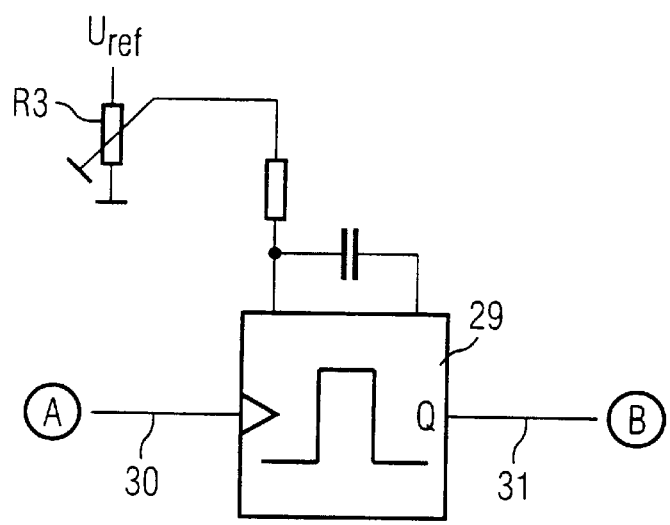
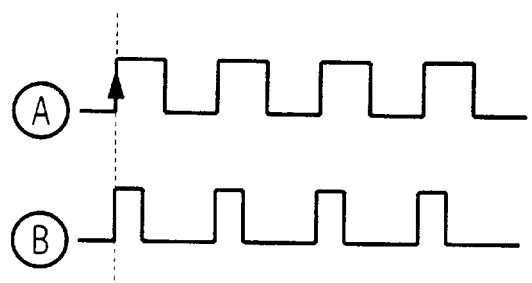

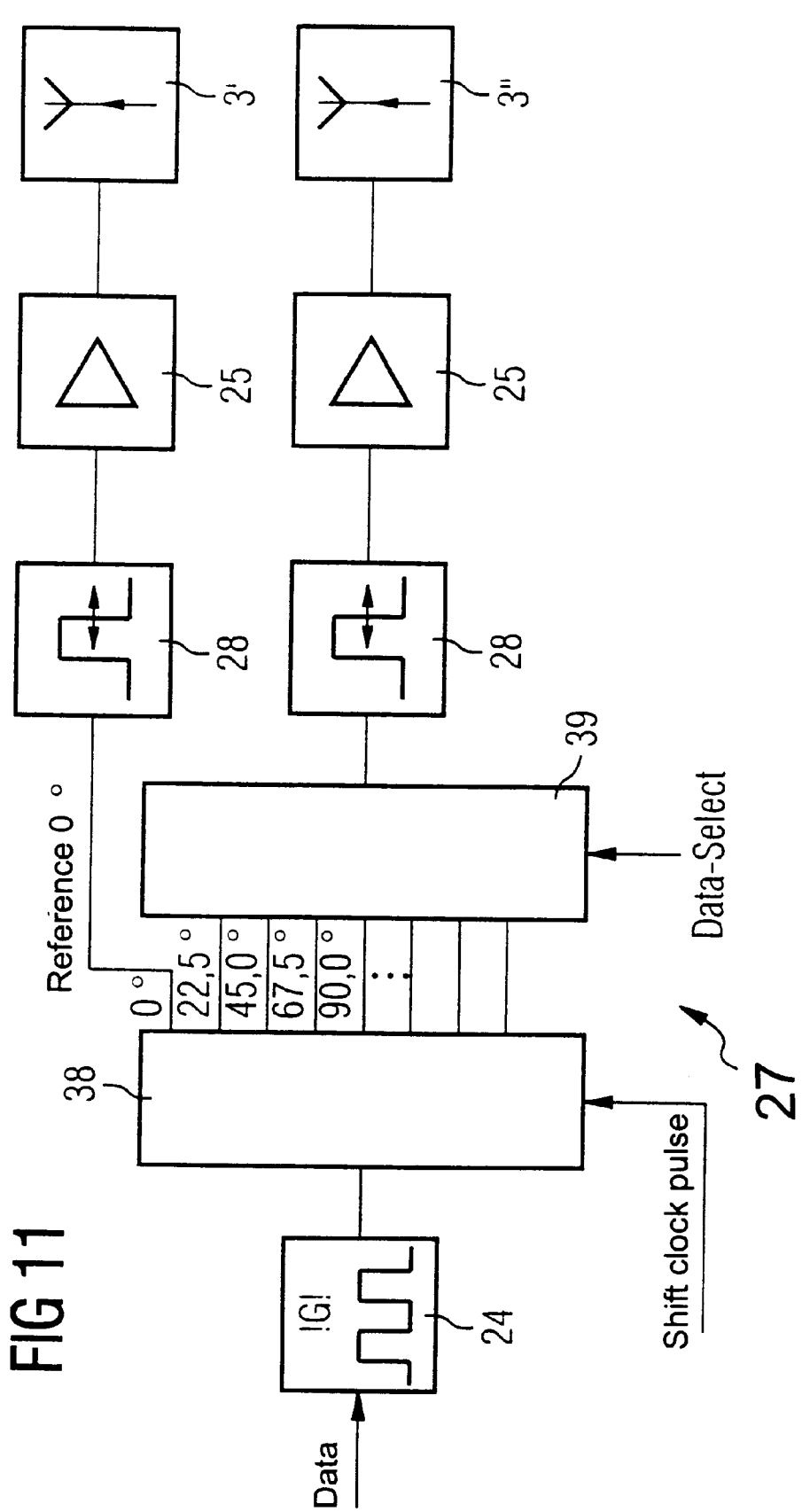

ANTI-THEFT SYSTEM FOR A MOTOR VEHICLE

BACKGROUND OF THE INVENTION

1. Field of the Invention

The invention resides in the automotive art. More specifically, the invention relates to an anti-theft system for a motor vehicle, in which doors are locked or unlocked, or an electronic immobilizer is released, only after proof of authorization is provided.

2. Description of the Related Art

A prior art anti-theft system—described in German patent disclosure DE 38 02 248 A1—has an antenna device in the driver's door. If a user wants to enter the vehicle, then a question-response dialog is triggered by actuating a trip switch. An interrogation signal is sent from the antenna device in the vehicle to a transponder carried by the user. The transponder transmits an enciphered response signal back if it receives the interrogation signal. In the motor vehicle, the response signal is compared with an expected desired signal, and if the two agree (successful authentication), then the doors are locked or unlocked.

The antenna device is implemented in the form of two frame antennas that are perpendicular to one another. The antennas generate electromagnetic fields. These fields induce a voltage in a transponder coil of the transponder. For the induced voltage to be as high as possible, the field lines must penetrate the transponder coil to a sufficient extent. This occurs whenever the field lines of the magnetic field generated extend not in a single plane but rather in at least two planes. The two frame antennas are disposed at right angles to one another for this reason. However, this requires a very large amount of installation space.

It can happen, however, that the portable transponder may accidentally be positioned with the winding face of its transponder coil such that the winding face still extends parallel to the field lines of the magnetic field. The transponder coil is then penetrated inadequately if at all by the magnetic field, so that the interrogation signal is not received by the transponder, or it is received with insufficient amplitude intensity.

In another prior anti-theft system—described in copending application No. 08/749,199 and German patent disclosure DE 195 42 441 A1—an antenna is used that comprises two frame antennas disposed close together and in the same plane. To generate a three-dimensional magnetic field, the two frame antennas are controlled separately from one another but in phase offset from one another. This creates a magnetic field that is moved back and forth in three dimensions. Once again, it can still happen that the winding faces of the transponder coil will not be sufficiently penetrated by magnetic field lines of the magnetic field generated by the two frame antennas.

Furthermore, the two frame antennas cannot always be disposed close together. This is the case for instance if one frame antenna is disposed in the front door and the other in the rear door. In that case, no—or an only slightly pronounced—magnetic field that moves back and forth is created, since the range of the magnetic field is limited.

SUMMARY OF THE INVENTION

It is accordingly an object of the invention to provide an anti-theft system for a motor vehicle, which overcomes the above-mentioned disadvantages of the heretofore-known devices and methods of this general type and in which signals are transmitted by a transmitter in the vehicle in such a way that they can be reliably received by a portable transponder in the vicinity of the motor vehicle, largely independently of the design of the transponder.

With the foregoing and other objects in view there is provided, in accordance with the invention, an anti-theft system for a motor vehicle, comprising:

a transceiver unit disposed in the motor vehicle, and at least two antennas electrically connected to the transceiver unit and disposed separate from one another in the motor vehicle, the antennas being adapted to transmit and receive a signal;

a main control unit connected to the transceiver unit, the control unit controlling the antennas for transmitting and receiving signals and evaluating the signals received by the antennas, whereby one signal is supplied to at least two of the antennas; and a power control unit and a phase control unit for selectively controlling one of a transmission power and a phase of the signals is controlled such that undesired feedback on the phase or the signals or the transmission power does not occur.

In accordance with an added feature of the invention, the main control unit forms a part of the transceiver unit.

In accordance with another feature of the invention, the power control unit and the phase control unit control the signals with respect to a pulse width thereof.

In accordance with an additional feature of the invention, the antennas are electrical coils forming part of an LC oscillator circuit strategically disposed in the motor vehicle, such as for instance in the driver's door, in the rear door on the driver's side, in the side wall at the back seat, in the wall at the fuel tank, or at a bumper of the motor vehicle.

In accordance with a further feature of the invention, the phase control unit is a shift register and a demultiplexer connected to the shift register.

In accordance with a concomitant feature of the invention, the power control unit comprises an upward counter and a comparator.

In other words, at least two antennas are disposed separately from one another in the motor vehicle. Two signals are broadcast via the antennas and the signals are different in terms of their phase relationship and their transmission power, and any change in the transmission power causes no unintended change in the phase, and vice versa. This is accomplished by means of the power control unit and the phase control unit.

Information contained in the signals is not changed by changes in phase and transmission power.

In this way, a superimposed magnetic field is generated, whose directional characteristic depends on the transmission power and the phase of the signals of each antenna. If the transmission power and/or the phase of the signals is varied on purpose, this creates magnetic fields which have changed in their three-dimensional distribution of intensity, compared with the preceding magnetic fields. Consequently the transponder, even under unfavorable conditions, can receive a sufficiently strong signal, on the basis of which it can return its response signal.

The values of the transmission powers and the phase settings of the signals can for instance be stored in memory as transmission parameters. The transmission parameters can also be varied systematically, so that an interrogation signal is still received by the transponder even if no signal was received at first.

Other features which are considered as characteristic for the invention are set forth in the appended claims.

Although the invention is illustrated and described herein as embodied in an anti-theft system for a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 7 is a schematic block circuit diagram of a power control unit;

FIGS. 8–10 are schematic circuit diagrams of exemplary embodiments of circuit configurations of a power control unit with associated signal graphs; and FIG. 11 is a schematic block diagram of an exemplary embodiment of a circuit for a phase control unit.

DESCRIPTION OF THE PREFERRED EMBODIMENTS

Figure 1:
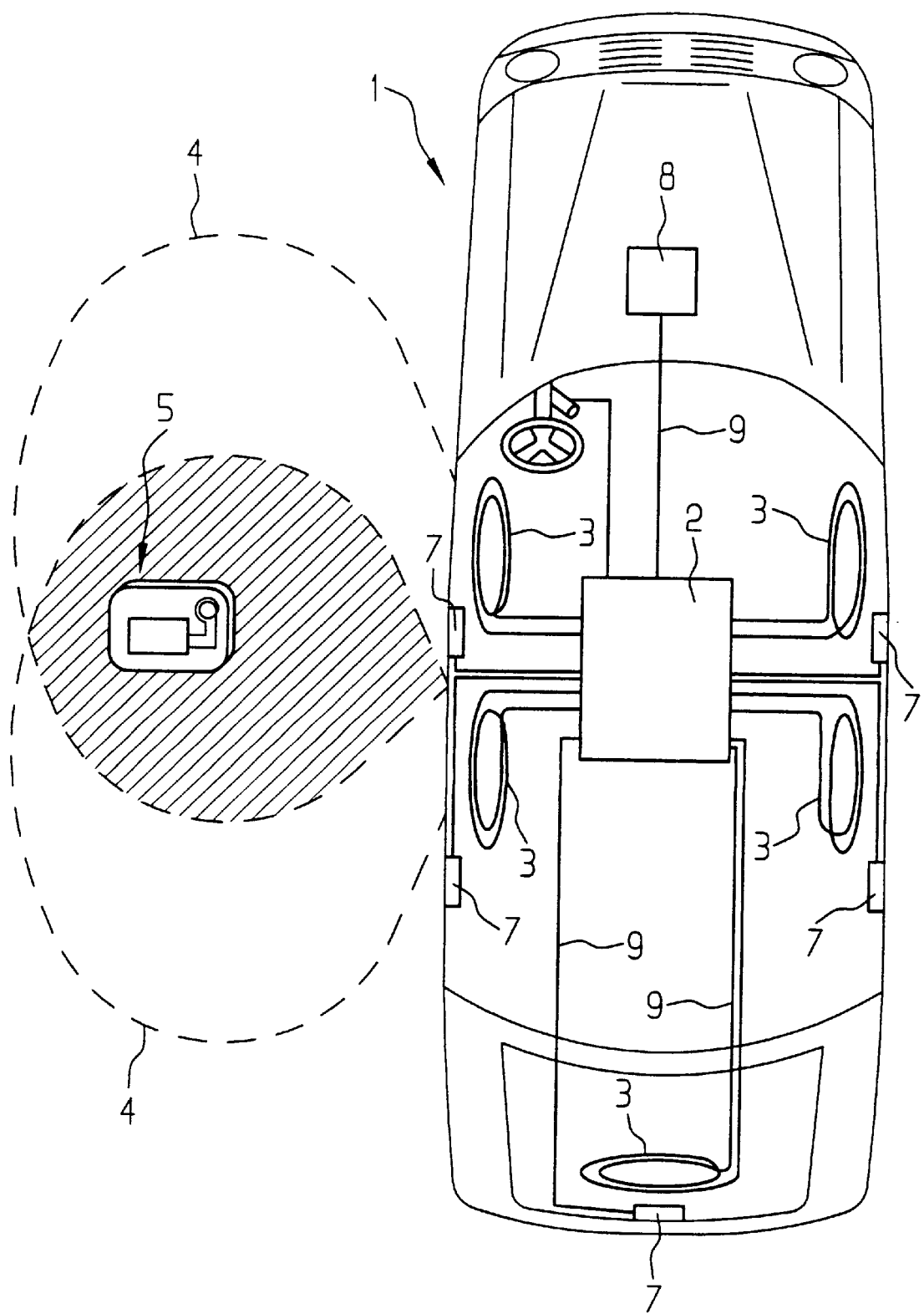
FIG. 1 is a schematic plan view of a motor vehicle anti-theft system according to the invention.

Referring now to the figures of the drawing in detail and first, particularly, to FIG. 1 thereof, there is seen an anti-theft system according to the invention for a motor vehicle 1. The system has a transceiver unit in the vehicle, with a main control unit 2 and antennas 3. The transceiver unit sends signals wirelessly via the antennas 3. Signals are received via the antennas 3 in the same way and evaluated in the main control unit 2.

The main control unit 2 is connected to a plurality of antennas 3, which are disposed for instance in the driver's door, the passenger door, the tailgates, the trunk, the area of the tank, the area of the bumper, or at other points—distributed over the motor vehicle 1. The signals are transmitted via at least two antennas 3, and each antenna 3 generates an electromagnetic field. The magnetic fields are superimposed on one another and form a three-dimensional superimposed magnetic field. A directional characteristic 4 and thus the range of the superimposed magnetic field depends on the transmission power of the individual antennas 3 and on the phase between the signals that are transmitted via the two antennas 3.

If someone seeks access to the motor vehicle 1, then first they have to prove their identity with the aid of a portable code transducer (hereinafter called a transponder 5). As soon as the user seeking access to the vehicle actuates a trip switch 6 (see FIG. 2), then via the antennas 3 a signal (hereinafter called a interrogation signal) is transmitted. If the interrogation signal is received by the transponder 5, then the transponder in turn sends coded information back in the form of an response signal.

Figure 2:
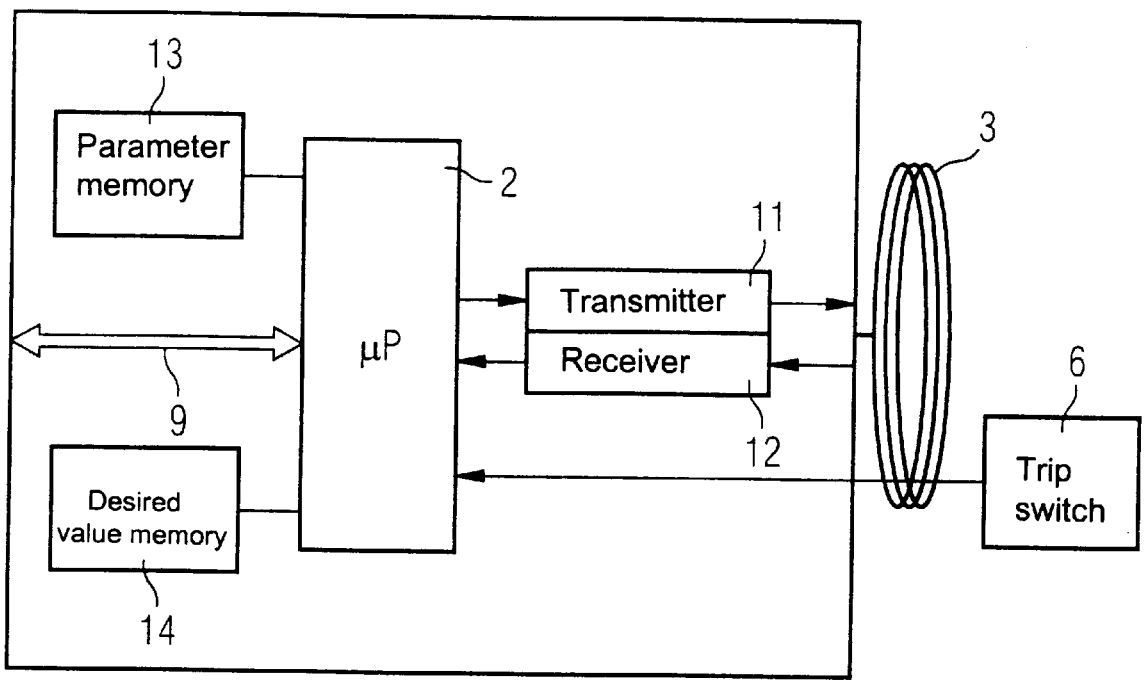
FIG. 2 is a block diagram of a transceiver unit of the anti-theft system of FIG. 1.

The response signal is received by the antennas 3 in the motor vehicle 1 and is carried to the control unit 2, which forms the evaluation unit. The response signal is evaluated there. The control unit 2 is connected to door locks 7, control devices (in particular, an immobilizer control device 8), or other electronic units in the motor vehicle 1 via data lines 9. If the transponder 5 is found to be authorized (successful authentication), then depending on the contents of the response signal, one or all of the door locks 7 are locked or unlocked, the immobilizer control device 8 is enabled, the dome light is turned on or off, the windows or sliding roof are opened or closed, the heater is turned on or off, and so forth. Via the control unit 2, control signals for this purpose are transmitted to the appropriate electronic units in the motor vehicle 1. In FIG. 2, the transceiver unit has the control unit 2, which may for instance be embodied as a microprocessor $\mu P$. The sending and receiving of signals is controlled by the control unit 2, and the received signals are evaluated and further electronic units in the vehicle are controlled by the control unit as well. To that end, the control unit is connected to at least one transmitter 11 and one receiver 12, in which the signals are modulated or demodulated.

Each antenna 3 is in turn connected to a respective transmitter 11 and receiver 12. Receiving signals is also possible via other, non-illustrated antennas.

The control unit 2 is connected to the door locks 7, the immobilizer control device 8, or other control devices via the data line 9 or a bus line. The transceiver unit also has memory units (parameter memory 13 and desired value memory 14), in which transmission parameters and desired information are stored.

With the stored transmission parameters, the control unit 2 receives the information as to the phase and power or amplitude with which the signals are to be transmitted or with which they were transmitted previously. The stored desired information is compared with the coded information, contained in the response signal and received, for the sake of authentication. By this means, the authorization of the user is accordingly checked.

Figure 3:
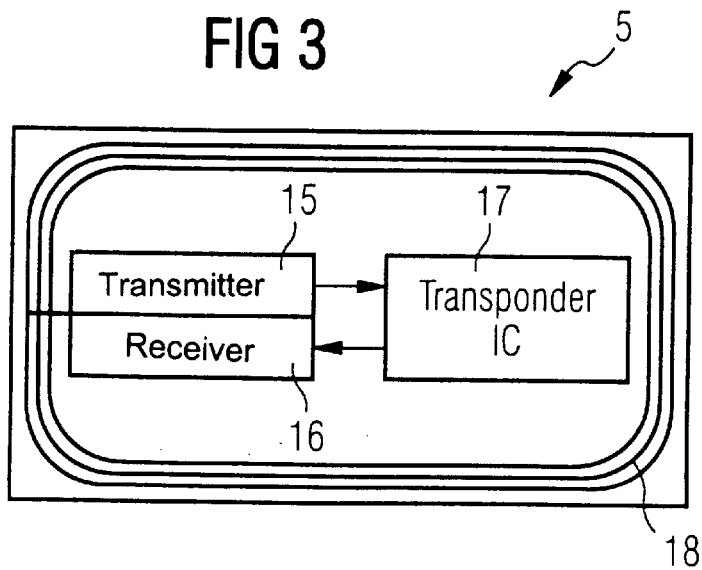
FIG. 3 is a block diagram of a portable transponder of the anti-theft system of FIG. 1.

The transponder 5 is advantageously disposed on a card the size of a credit card. It has a transmitter 15 (FIG. 3) and a receiver 16, which are connected to a transponder IC 17. With the transponder IC 17, user-specific desired code information that is safeguarded against unauthorized access is stored in memory, or such information is generated with the aid of a secret mathematical algorithm.

The code information is transmitted, enciphered, in the response signal to the motor vehicle 1 if a interrogation signal has been received beforehand.

For sending and receiving signals, the transponder 5 has an antenna in the form of a coil (transponder coil 18). In this transponder coil 18—upon reception of signals 0 a voltage is induced, if the transponder coil 18 is within the range of a magnetic field (see FIG. 1) and is penetrated by sufficiently many field lines, or in other words if the magnetic field in the region of the transponder coil 18 is sufficiently strong.

Figure 4:
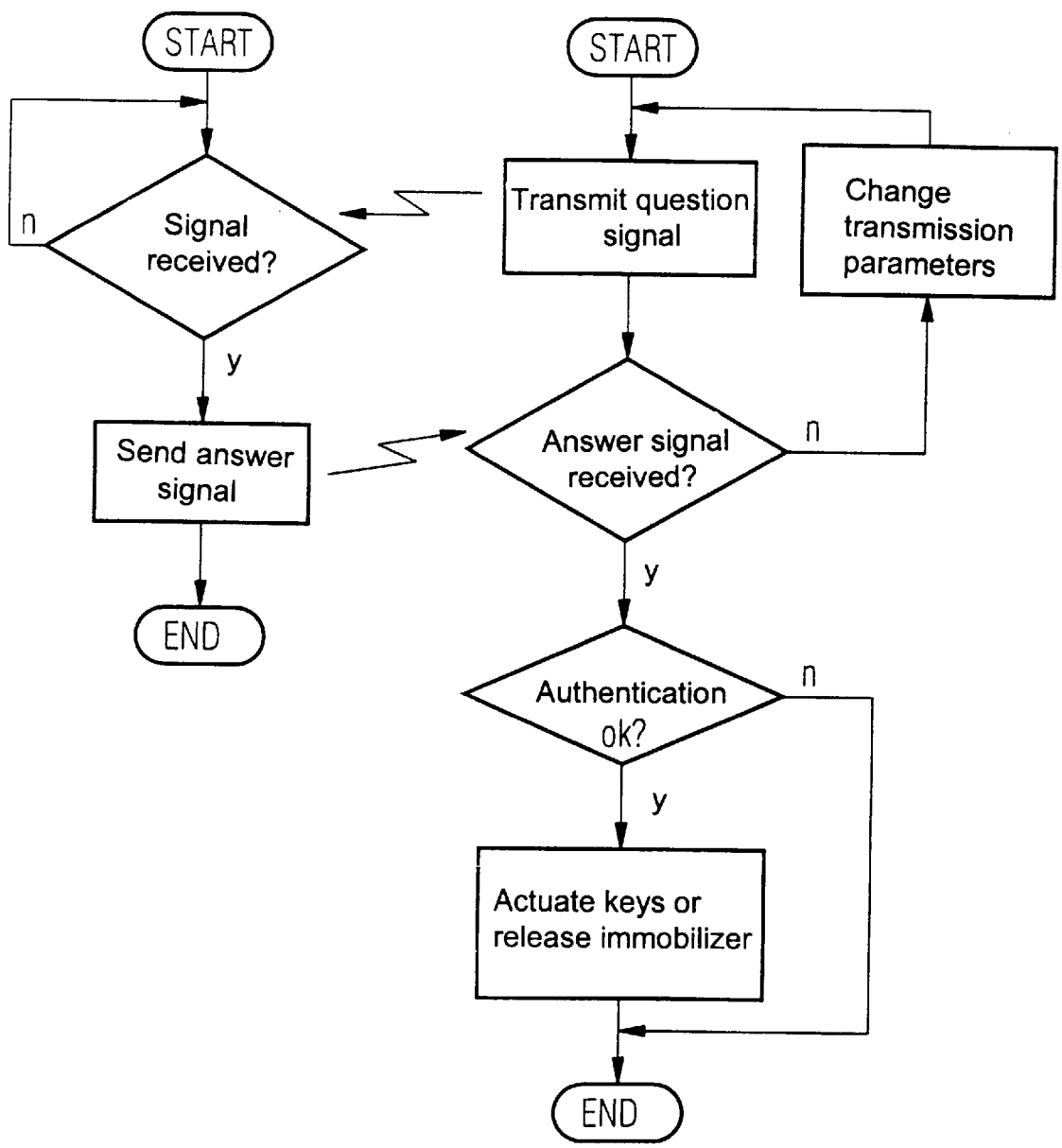
FIG. 4 is a flow chart of a method for authentication with the aid of the transponder.

The method for authentication will now be described in further detail with reference to FIG. 4. In FIG. 4, the method steps that take place in the transponder 5 are shown on the left, and the method steps that take place in the transceiver unit of the motor vehicle 1 are shown on the right.

First, an interrogation signal is transmitted from the motor vehicle 1 via at least two antennas 3. If an interrogation signal has been received by the transponder 5, then the response signal is transmitted back by the transponder 5. If the response signal is not received within a predetermined length of time, then the transmission parameters are changed systematically (in accordance with a previously defined scheme). Because of the altered transmission parameters, the directional characteristic 4 and the spatial distribution of the superimposed magnetic field change as a consequence of an altered transmission power and/or phase of the transmitted signals. After that, the question/response dialog is performed again.

If the response signal has been received by the transceiver unit in the vehicle, then the code information it contains is compared with the expected desired code information. If the authentication was successful (if the code information is the same as the desired code information) then the door locks 7 are unlocked, or the immobilizer is released. To that end, at least one control device necessary for operation of the motor vehicle, such as the engine control unit is properly put into operation by the immobilizer control device 8.

If the authentication was unsuccessful, then the authentication process is terminated. Optionally, an alarm can be given if an attempt is made to perform the authentication with an unauthorized transponder 5.

Via at least two antennas in the motor vehicle 1, the interrogation signal is transmitted. Since the antennas 3 are embodied as coils, high-frequency magnetic fields are generated, which are superimposed (see shaded region in FIG. 1) in accordance with the location of the antennas 3, the external form of the antennas 3, and the distribution of intensity of the individual magnetic fields of each antenna 3.

The antennas 3 transmit signals that differ from one another in their transmission frequency, transmission power, and/or phase. By purposeful changes in one of these parameters, the directional characteristic 4 of the field and the local distribution of intensity are changed. As a consequence, the resultant magnetic field (the superimposed magnetic field) is three-dimensionally changed.

By systematically varying the transmission parameters, it can thus be assured that the transponder 5 will be addressed reliably at least once. If a user wants to enter his or her vehicle, then they must first trip the question and response dialog. Depending on where they carry the transponder 5 and on how the transponder coil 18 is oriented with its winding face with respect to the magnetic field, with its magnetic field lines, generated by the antennas 3 in the motor vehicle 1, the interrogation signal can be received with variable strength.

It is known that the highest voltage is induced in the transponder coil 18 if the transponder 5 with its transponder coil 18 is oriented in such a way that the magnetic field lines of the magnetic field intersect the transponder coil at right angles (winding face perpendicular to the magnetic field lines). The interrogation signal is then optimally received.

However, if the transponder coil 18 is oriented such that the magnetic field lines extend parallel to the winding face of the transponder coil 18, then no voltage is induced in the transponder coil 18. The interrogation signal is not received then, even though the transponder 5 is close enough to the motor vehicle 1 and is within the range of the antennas 3. It can also happen that there are local regions in the superimposed magnetic field in which the field has only very slight intensity, so that once again the interrogation signal cannot be received, or can be received only at excessively low strength.

If the interrogation signal in certain regions is not received even though the range of the magnetic field should suffice, then the term "local void" is used for such a case. A transponder S is located in a void, if the intensity of the voltage induced in the transponder coil 18 is below a threshold value.

The locations of the voids depend on various parameters, such as the location or orientation of the transponder coil 18 on the one hand but on the other also on the mounting site of the antennas 3 in the motor vehicle 1, the external form of the antennas 3, the transmission power or amplitude, and the phase of the signals of two antennas 3 relative to one another.

So that a transponder 5 located in a void can also be reached, the antennas 3 are triggered in succession differently in terms of their transmission power and phase. If a signal is transmitted via two antennas 3, then for each antennas 3 an alternating magnetic field arises, which is superimposed on the alternating magnetic field of the other antenna 3. By varying the individual fields, successively different superimposed magnetic fields are created, whose spatial intensity distribution is dependent on the transmission parameters (in this case, the transmission power and phase; in automotive applications, the transmission frequency is constant at 125 kHz).

The systematic changes in the transmission power and phase proceed imperceptibly to the user, specifically whenever initially no response signal is received. After that, the interrogation signal is generated under altered magnetic field conditions (different transmission parameters), and a wait for an response signal again ensues.

In the anti-theft system, a carrier oscillation of 125 kHz, for instance, is modulated with binary coded information or code information (FIGS. 5 and 6A) of 2 kHz, for instance. The antennas 3 are thus controlled with binary coded signals (square-wave signals 20 with a duty cycle fixed by the coded information), by which a corresponding oscillation in the antennas 3 is generated. The coded information is contained in the envelope curve of the square-wave signals 20.

If the power or amplitude of the square-wave signals 20 is varied, then consequently the phase of the transmitted signals also varies more or less, and vice versa. The binary information contained in the square-wave signals 20 is not varied, however.

To obtain a defined distribution of intensity in the superimposed magnetic field, the transmission power is varied according to the invention such that it has no unintended influence on the phase, and vice versa. Thus the transmission power is adjusted and at the same time the phase is corrected such that it remains constant, and vice versa.

Figure 5:
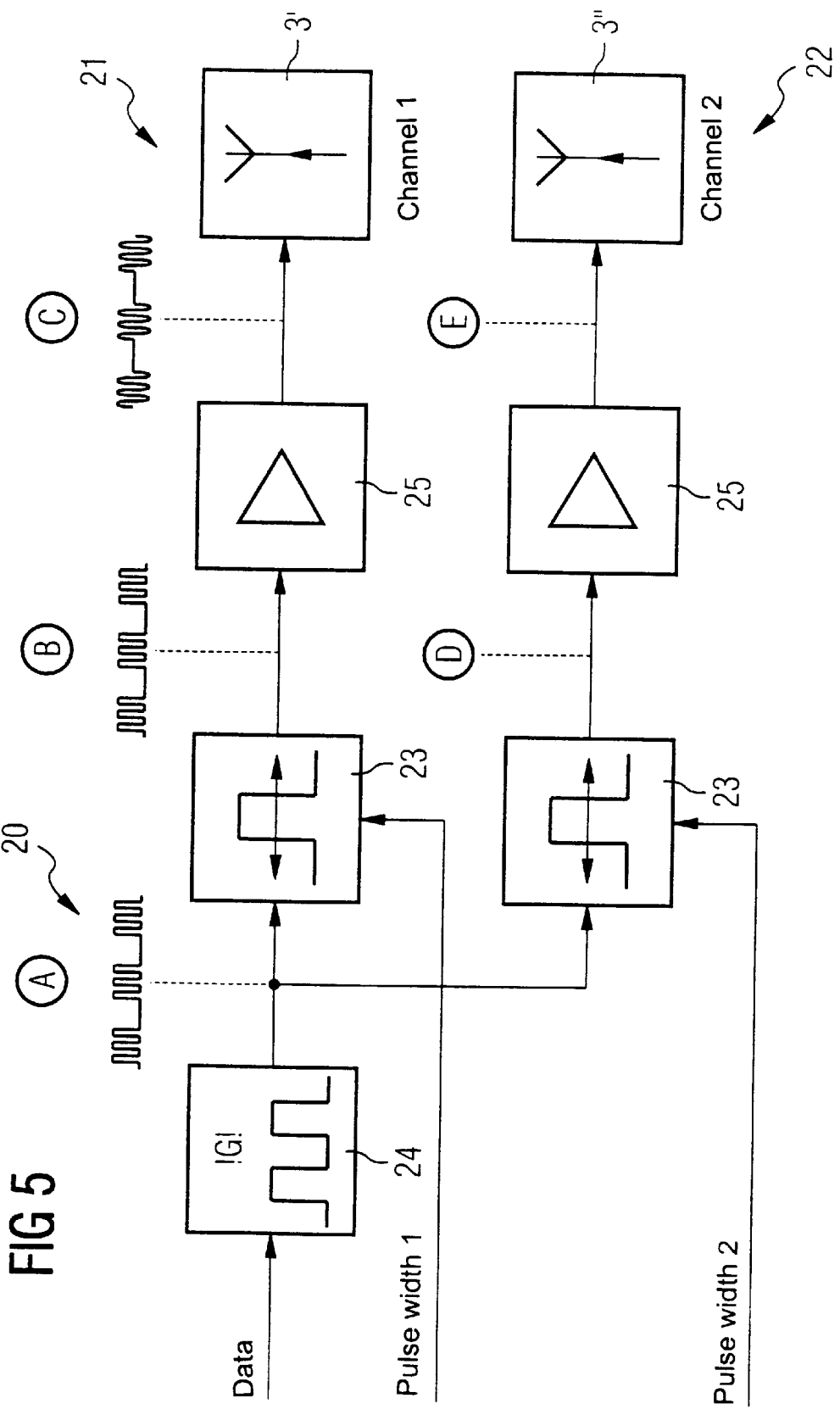
FIG. 5 is a more-detailed, schematic block circuit diagram of two transmission and reception channels of the anti-theft system.

A block circuit diagram of transmission channels 21, 22 of the transceiver unit with a pulse control unit 23 (symbolically represented by a double-headed arrow above the leading and trailing edges) is shown in FIG. 5. Data from the control unit 2, which contain the binary code information to be transmitted, are delivered to an oscillator 24. In the oscillator 24, modulation with a high-frequency carrier takes place. At the output of the oscillator 24, the corresponding square-wave signal 20 is available, whose envelope curve contains the binary code information. With this square-wave signal 20, two antennas 3' and 3"—in the case of the exemplary embodiment of FIG. 5—are controlled for transmitting the binary code information (interrogation signal).

The pulse control unit 23 is disposed downstream of the oscillator 24. By means of this pulse control unit, the square-wave signal 20 is controlled is terms of its amplitude and phase. The change in amplitude and/or phase is controlled—as described in further detail hereinafter—by varying the pulse width of the individual pulses of the square-wave signal 20.

The values for the pulse widths are received by the pulse control unit 23 from the control unit 2.

The square-wave signal 20, varied in amplitude and/or phase, is delivered to the two antennas 3' and 3" via an end stage 25. Each antenna 3 is part of an LC oscillator circuit. If such an oscillator circuit is induced to oscillate by a square-wave signal, then it oscillates in the form of a pulsed sine wave signal, and the binary code information is again contained in the envelope curve of this sine wave signal.

The antennas 3' and 3" are disposed parallel to one another and are connected to the control unit 2 via the oscillator 24. Each branch in which an antenna 3' or 3", an end stage 25, a pulse control unit is located is called a transmission channel 21, 22.

Figure 6:
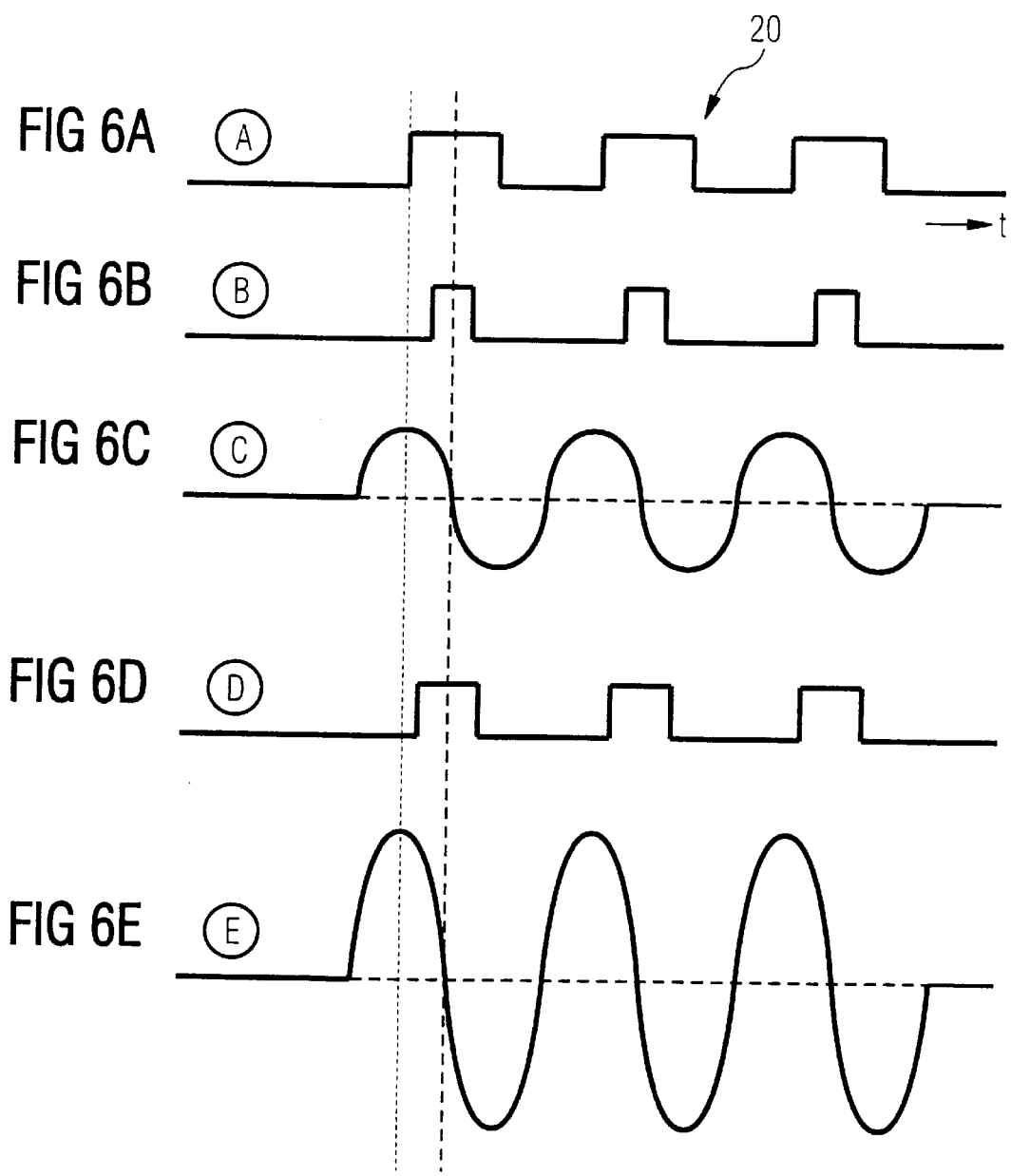
FIGS. 6A–6E are graphs of signals within the transceiver unit.

In FIGS. 6A–6E, signal courses for the circuit arrangement of FIG. 5 are shown. In FIG. 6A, the basic pattern of the binary code information, specifically the square-wave signal 20, is shown. The code information is transmitted via the antennas 3 as an interrogation signal, to design the superimposed magnetic field three-dimensionally appropriately, the interrogation signal is transmitted over the two transmission channels 21 and 22 with a different transmission power or amplitude and phase. By this means it is already attained that the voids, compared with a interrogation signal transmitted with identical transmission parameters, are shifted in such a way that they are unlikely to be located in the region of the possible location of the transponder 5 at that time.

The binary code information is transmitted at low amplitude, for instance via the antenna 3' in the first transmission channel 21, and at high amplitude in the second transmission channel 22. The phase between the two signals, however, should remain unchanged at first.

The control unit 2 now specifies a narrow pulse width to the pulse control unit 23. The signal at the output of the pulse control unit 23 of the first transmission channel 21 then—as shown in FIG. 6B—has narrow pulses. The pulse control unit 23 then also assures that the phase of the signal remains unchanged with respect to the centers of the pulses and is chronologically synchronized with each pulse rise of the binary code information (see FIGS. 6A and 6B). By means of the narrow pulse width—as will be described in further detail hereinafter—a sinusoidal oscillation (FIG. 6c) is generated, following the end stage 25 of the first transmission channel 21, with has a low amplitude. The binary code information continues to be contained in its envelope curve.

The pulse control unit 23 of the second transmission channel 22 receives a wide pulse width as a specification from the control unit 2. As a result, the pulses (FIG. 6D) at its output widen, and as a result a higher amplitude (FIG. 6E) of the sinusoidal signal is obtained downstream of the end stage 25 of the second transmission channel 22. The phase of these pulses is again kept constant, such that the pulse centers are chronologically synchronized with each pulse rise in the binary code information (see FIGS. 6A and 6D). The pulse width is accordingly varied, and at the same time its rise time is shifted timewise. In this way, the phase does not change in either of the two transmission channels 21 and 22, even if the amplitude and thus the transmission power is different.

Since the antennas 3 are part of an LC oscillator circuit, useful oscillation is obtained only if—as in a pendulum—the supplied energy has the same orientation as the oscillation displacements, because otherwise no escalation of the oscillation can occur. The energy delivery can be continuous or intermittent within a period, that is, for a relatively short time to a recurring fixed starting point. If the force in both cases is of equal magnitude, then because of the different current flow times a major and a minor oscillation result. The question now is how the starting point for the energy flow in both cases should be fixed so that the resultant oscillations are—in chronological terms—coincident.

Naturally, an oscillation swings symmetrically about a zero line. The zero crossover of the oscillation is at the same time the starting point for energy delivery in two directions. The directions are defined by a change of sign, at which the current flow between the coil L and the capacitor C of the LC oscillator circuit reverses.

For a narrow pulse width, where the center of the pulse matches the zero crossover of the oscillation, a minor oscillation is generated. If the pulse is wider, more energy is delivered to the oscillation, and oscillation with a greater amplitude is generated. If the leading edge of a widened or shortened pulse width is adjusted in phase by the pulse control unit 23 in such a way that the pulse center matches the zero crossover of the oscillation, then the amplitude does vary, but the phase of the oscillation does not.

In this way, the amplitude of an oscillation can be varied in a simple way without affecting the phase of the oscillation. On the other hand, if the phase is to be varied, then the pulse signal can be delayed chronologically. In other words, the time of the leading and trailing edge must be shifted by the same amount. This has no influence on the amplitude, because no further energy is injected into the oscillation. Thus the amplitude need not be readjusted. A phase change thus remains without effect on the amplitude.

Figure 9:
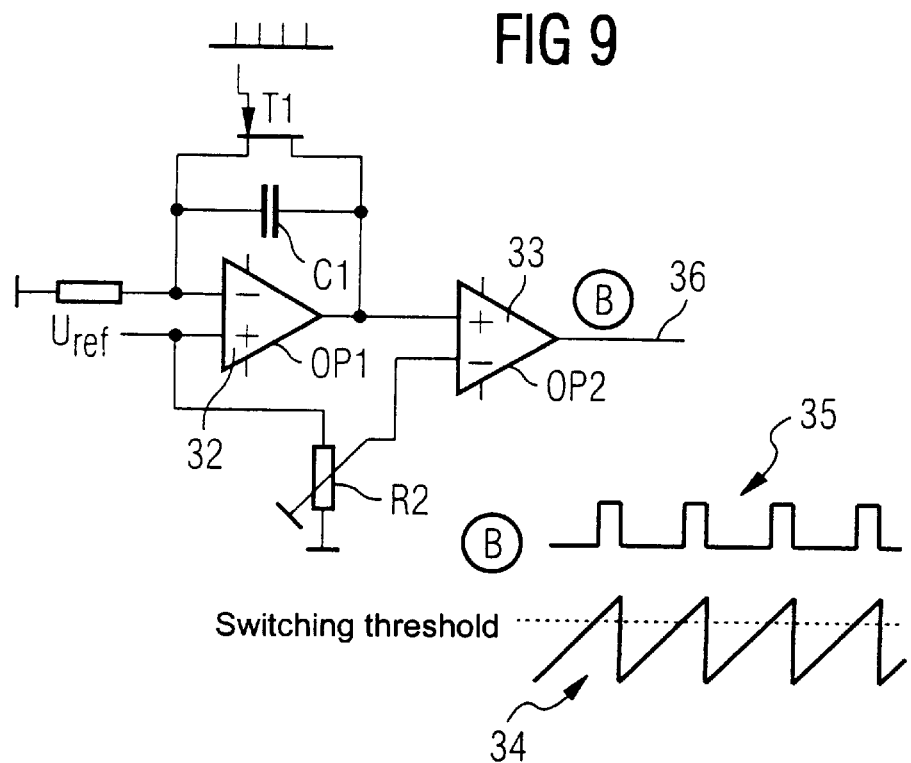
Figure 10:
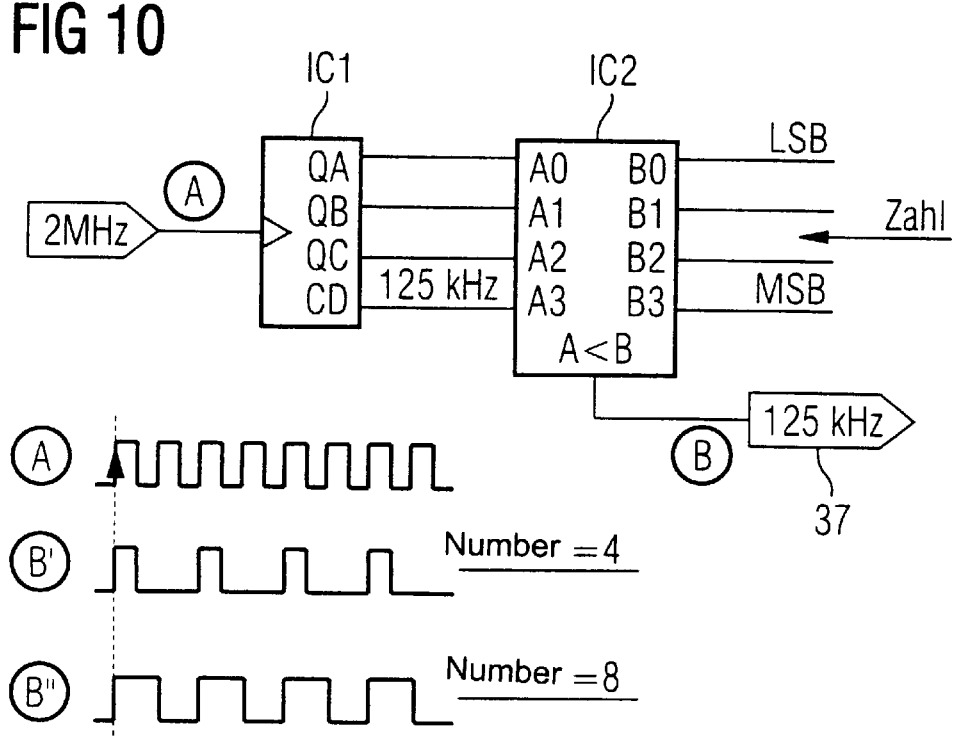

The realization of this kind of pulse control unit 23 is shown in FIGS. 7–11, in which the pulse control unit 23 is divided into a phase control unit 27 and a power control unit 28. In FIGS. 8–10, for the circuit arrangements shown, corresponding signal courses within the circuit arrangements are also shown.

In FIG. 7, only the power control unit 28 (symbolized with a double-headed arrow above only the trailing edge of the pulse) of the transmission channel 21 is shown. By means of this unit, the pulse width is varied so that a greater or smaller amplitude of the oscillation is generated. Without the phase control unit 27, this automatically causes a change in phase, but according to the invention this is prevented with the aid of the phase control unit 27.

Below, only the power control unit 28 without the phase control unit 27 will be considered first. The power control unit 28 may be embodied in analog form in accordance with FIG. 8, with the aid of a monostable multivibrator 29. The monostable multivibrator 29, triggered at constant frequency, outputs the desired duty cycle (ratio of pulse width to pulse interval) by adjusting the current (square-wave signal 20) at its input 30 accordingly with the aid of a resistor R3. At its output 31, the desired square-wave signal 31' is then available.

Alternatively, a ramp generator 32 (FIG. 9) together with a comparator 33 may also be used to vary the pulse width. Needle pulses of constant frequency discharge an integration capacitor C1 cyclically via a transistor T1. As a result, at the output of the ramp generator 32 (in the form of an operational amplifier OP1), a sawtooth voltage 34 is formed, which is delivered to the comparator 33 (embodied as an operational amplifier OP2). The switching threshold of the comparator 33 is an adjustable direct voltage, which is adjusted with a resistor R2. On the basis of this switching threshold, the desired duty signal of the square-wave signal 35 is then obtained at the output 36 of the comparator 33. This output signal is then delivered to the end stage 25.

Referring now to FIG. 10, the power can also be controlled digitally. A binary value of an upward counter IC1 operating at a constant frequency is delivered to a four-bit comparator IC2. An adjustable comparison value (a number from 1 to 8) is applied to second inputs of the comparator IC2. The number specifies the desired duty cycle of the square-wave signal (which corresponds to the transmission parameter furnished by the control unit 2). By comparing the magnitude of the input values at the inputs A and B, the desired duty cycle is obtained at the output 37 (A<B) of the comparator IC2. The duty cycle is shown once for the number "4" (C') and once for the number "8" (C").

Referring now to FIG. 11, the phase control unit 27 may be implemented with the aid of a shift register 38 and a demultiplexer 39. All the transmission channels 21, 22 are linked via the eight-bit shift register 38 used in this case. The square-wave signal is present at the output of the shift register 38 with different phases (0°, 22.5°, 45°, etc.). By suitable selection of the phase relationship, a desired output of the demultiplexer 39 and thus the desired phase relationship is delivered to the second transmission channel 22—in the exemplary embodiment of FIG. 11. Compared with the first transmission channel 21, which is controlled with the reference position 0°, the signal in the second transmission channel 22 then has the desired phase. Next, the desired power can be set in the power control unit 28.

The pulse width control described above for fixing the power and the phase can also be implemented in the form of push-pull triggering. The oscillator circuit is then supplied with energy both in a positive half-wave and a negative half-wave. To that end, either a full-bridge circuit or a half-bridge circuit (not illustrated) can be supplied with positive and negative supply voltage. The individual switches of the bridge circuits are turned on and off in timed fashion, so that corresponding pulse width modulated signals result, with which the oscillator circuit is induced to oscillate. Full and half bridges are already well known to those of skill in the art and, therefore, need not be described in detail.

By means of the anti-theft system of the invention, the locations of voids are averted or spatially shifted by differential triggering, so that they are no longer located in the region of the transponder 5, yet successful authentication can still take place. The voids can be shifted in a replicable, defined way only if the power and phase of the signals are controlled such that a change in power causes no change in phase, and vice versa, or in other words that the mutual influence o f the power control unit 28 and the phase control unit 27 is effectively controlled.

The values for the transmission parameters at which a successful authentication has taken place can be stored in memory an d used as starting values in later authentication operations. This increases the likelihood that only one authentication operation will have to be performed. This shortens the process of authentication. The transmission parameters may also be varied systematically, preferably in predetermined stages, so that the superimposed magnetic field changes markedly in its spatial distribution of intensity.

The anti-theft system of the invention has the advantage that it can be used in quite different motor vehicles. To that end, the anti-theft system need not be adapted in terms of geometry (long version, short version), equipment category (sliding roof, convertible top, and so forth) and the materials used (aluminum, magnesium alloys). Component tolerances and temperature changes likewise have little influence on successful authentication, since the superimposed magnetic field is varied by the transmission parameters and always reliably reaches a transponder 5 even if it is located in what is initially a void. By varying the transmission power and/or the phase, the void is shifting spatially or eliminated entirely. After that, the transponder 5 should be able to receive the interrogation signal successfully and send back its response signal. If it still does not receive the signal, then the transmission parameters have to be changed again.

With the power control unit 28 and the phase control unit 27, control of the transmission power and phase can be done with as little loss as possible, since an intermittent signal (square-wave signal) is used for the control. It is also possible for a plurality of antennas 3 to be controlled independently of one another.

With the anti-theft system, the ranges of the individual antennas 3 can be adjusted such that reliable indoor and outdoor detection of the transponder 5 is possible. The range and the directional characteristic 4 can be adjusted such that if the transponder 5 is to be detected only indoors, then the interrogation signals cannot be received outside the motor vehicle 1 (indoor detection), and vice versa.

If the transponder 5 is detected outdoors (that is, if it sends its response signal back), then access is enabled by unlocking one or all of the doors. If the transponder 5 is properly detected indoors, then the immobilizer is released, and the user is allowed to drive away with the motor vehicle 1. When the vehicle is locked, the transponder 5 must be detected outdoors again, to avert the risk that the transponder will be locked inside the vehicle by mistake.

I claim:

1. An anti-theft system for a motor vehicle, comprising:
   a transceiver unit disposed in a motor vehicle;
   at least two antennas disposed separate from one another in the motor vehicle and electrically connected to said transceiver unit, each of said antennas being adapted to transmit a transmission signal and receive a receiving signal;
   a main control unit connected to said transceiver unit, said main control unit evaluating receiving signals received by said antennas; and
   a power control unit and a phase control unit controlled by said main control unit for selectively and individually controlling a transmission power and a phase of each of said transmission signals to prevent undesired feedback on said phase or said transmission power of said transmission signals from occurring.

2. The anti-theft system according to claim 1, wherein said control unit forms a part of said transceiver unit.

3. The anti-theft system according to claim 1, wherein said power control unit and said phase control unit control the signals with respect to a pulse width thereof.

4. The anti-theft system according to claim 1, wherein said antennas are electrical coils forming part of an LC oscillator circuit strategically disposed in the motor vehicle.

5. The anti-theft system according to claim 4, wherein said coils are disposed in a driver's door, in a rear door on a driver's side, in a side wall at a back seat, in a wall at a fuel tank, and at a bumper of the motor vehicle.

6. The anti-theft system according to claim 1, wherein said phase control unit is a shift register and a demultiplexer connected to said shift register.

7. The anti-theft system according to claim 1, wherein said power control unit includes an upward counter and a comparator.

* * * * *